US008270941B2

(12) United States Patent
Kenagy et al.

(10) Patent No.: US 8,270,941 B2
(45) Date of Patent: Sep. 18, 2012

(54) SYSTEM AND METHOD FOR DOWNLOADING USER INTERFACE COMPONENTS TO WIRELESS DEVICES

(75) Inventors: Jason B. Kenagy, La Jolla, CA (US); Marc Edward Nijdam, San Diego, CA (US); Christophe Bernard, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1007 days.

(21) Appl. No.: 11/361,274

(22) Filed: Feb. 24, 2006

(65) Prior Publication Data

US 2007/0203719 A1    Aug. 30, 2007

(51) Int. Cl.
*H04M 11/00* (2006.01)
*H04M 1/38* (2006.01)

(52) U.S. Cl. ........ 455/405; 455/450; 455/566; 713/152; 713/166; 345/533; 345/534

(58) Field of Classification Search .................. 455/405, 455/566; 713/152, 166; 726/24; 380/233; 345/533, 534
See application file for complete search history.

(56) References Cited

U.S. PATENT DOCUMENTS

| 7,093,198 | B1* | 8/2006 | Paatero et al. ................. 715/746 |
| 2002/0137502 | A1 | 9/2002 | Cronin et al. |
| 2003/0060189 | A1 | 3/2003 | Minear et al. |
| 2003/0149917 | A1 | 8/2003 | Smith et al. |
| 2004/0107219 | A1* | 6/2004 | Rosenberger .............. 707/104.1 |
| 2004/0111578 | A1* | 6/2004 | Goodman et al. ........... 711/163 |
| 2005/0021935 | A1* | 1/2005 | Schillings et al. ................. 713/1 |
| 2005/0120209 | A1* | 6/2005 | Kwon et al. .................. 713/161 |
| 2005/0210448 | A1 | 9/2005 | Kipman et al. |
| 2005/0231641 | A1* | 10/2005 | Suito ............................. 348/555 |

(Continued)

FOREIGN PATENT DOCUMENTS

EP    1489497    12/2004

(Continued)

OTHER PUBLICATIONS

Netscape Communications Corporation: "Establishing trust for downloaded software" Internet Citation, [Online] Jul. 2, 1997. XP002155043. Retrieved from the Internet: URL: http://developer.netscape.com:80/docs/manuals/signedobj/trust/owp.htm> [retrieved on Dec. 8, 2000] the whole document.*

(Continued)

*Primary Examiner* — George Eng
*Assistant Examiner* — Jing Gao
(74) *Attorney, Agent, or Firm* — Robert J. O'Connell; Nicholas A. Cole

(57) ABSTRACT

A method of processing a user interface component is provided and includes receiving one or more user interface components that can be communicated to a wireless device. A component risk level for each of the one or more user interface components is determined and assigned to each of the one or more user interface components. Each of the one or more user interface components can be digitally signed using an embedded risk code that indicates the assigned risk level. Further, the component risk level can be selected from a plurality of component risk levels. In a particular embodiment, the component risk level can be determined based on the type of the user interface component. Further, the component risk level can be determined based on a developer of the user interface component.

121 Claims, 10 Drawing Sheets

U.S. PATENT DOCUMENTS

2006/0190988 A1* 8/2006 Adams et al. .................. 726/2

FOREIGN PATENT DOCUMENTS

| KR | 1020030085270 | 11/2003 |
|---|---|---|
| WO | WO03107201 | 12/2003 |

OTHER PUBLICATIONS

Netscape Communications Corporation: Establishing trust for downloaded software: Internet Citation, [Online] Jul. 2, 1997, XP002155043 Retrieved from the Internet: URL:http://developer.netscape.com:80/docs/manuals/signedobj/trust/owp.htm> [retrieved on Dec. 8, 2000] the whole document.

International Search Report and Written Opinion—PCT/US2007/062816, International Search Authority—European Patent Office—Jun. 26, 2007.

* cited by examiner

SYSTEM AND METHOD FOR DOWNLOADING USER INTERFACE COMPONENTS TO WIRELESS DEVICES

BACKGROUND

I. Field

The present disclosure generally relates to user interfaces for wireless devices. More particularly, the disclosure relates to downloading user interface components to wireless devices.

II. Description of Related Art

Advances in technology have resulted in smaller and more powerful wireless devices. For example, there currently exist a variety of wireless devices, including mobile phones, personal digital assistants (PDAs), laptops, and paging devices that are small, lightweight, and easily carried by users. These devices may include the ability to transmit voice and/or data over wireless networks. Further, many such wireless devices provide significant computing capabilities, and as such, are becoming tantamount to small personal computers and handheld PDAs.

Typically, these smaller and more powerful wireless devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such wireless devices.

Some of these wireless devices utilize application programming interfaces (APIs) that are sometimes referred to as runtime environments and software platforms. The APIs can be installed onto a wireless device to simplify the operation and programming of such wireless devices by providing generalized calls for device resources. Further, some APIs can provide software developers the ability to create software applications that are executable on such wireless devices. In addition, APIs can provide an interface between a wireless device system hardware and the software applications. As such, the wireless device functionality can be made available to the software applications by allowing the software to make a generic call for a function, thus, not requiring the developer to tailor its source code to the individual hardware or device on which the software is executing. Further, some APIs can provide mechanisms for secure communications between wireless devices, such as client devices and server systems, using secure cryptographic key information.

Examples of such APIs, some of which are discussed in more detail below, include those currently publicly available versions of, the Binary Runtime Environment for Wireless® (BREW®) platform, developed by Qualcomm, Inc. of San Diego, Calif. The BREW® platform can provide one or more interfaces to particular hardware and software features found on wireless devices.

Further, the BREW® platform can be used in an end-to-end software distribution system to provide a variety of benefits for wireless service operators, software developers and wireless device manufacturers and consumers. One such currently available end-to-end software distribution system, called the BREW® solution developed by QUALCOMM Incorporated, includes logic distributed over a server-client architecture, wherein the server can perform billing, security, and application distribution functionality, and wherein the client can perform application execution, security and user interface functionality.

Some of the software applications that are developed to operate on the BREW® platform and that can be downloaded to wireless devices can include user interface components. After being downloaded to a wireless device, a user interface component can be executed to update or replace a previously existing user interface component, e.g., a background or a skin. Sometimes the user interface component can include one or more program bugs and executing the user interface component at the wireless device may render the wireless device inoperable.

Accordingly it would be advantageous to provide an improved system and method of downloading user interface components to wireless devices.

SUMMARY

A method of processing a user interface component is provided and includes receiving one or more user interface components that can be communicated to a wireless device. A component risk level for each of the one or more user interface components is determined and assigned to each of the one or more user interface components.

In a particular embodiment, each of the one or more user interface components is digitally signed using an embedded risk code that indicates the assigned risk level. Further, the component risk level can be selected from a plurality of component risk levels. In a particular embodiment, the component risk level can be determined based on the type of the user interface component. Further, the component risk level can be determined based on a developer of the user interface component. For example, a lower risk level can be assigned to each user interface component that is developed by an approved developer. On the other hand, a higher risk level can be assigned to each user interface component that is developed by an unapproved developer.

In a particular embodiment, the method further includes downloading the one or more user interface components to a wireless device. Moreover, the multiple user interface components can be bundled together in order to generate a user interface bundle and a bundle risk level for the user interface bundle can be determined. Particularly, the bundle risk level can be determined based on each component risk level of the user interface components within the user interface bundle. Also, the user interface bundle can be digitally signed. The user interface bundle can also be downloaded to the wireless device. In a particular embodiment, the method includes charging a fee to download the user interface bundle to the wireless device. Particularly, the user interface bundle can be downloaded to the wireless device via an over the air interface, although, cabled downloads are also possible.

In another embodiment, a method of obtaining user interface components at a wireless device is provided. The method includes accessing a download server and receiving a user interface bundle from the download server. Particularly, the user interface bundle can include a bundle risk level that is associated with loading the user interface bundle onto the wireless device.

In yet another embodiment, a wireless device is provided and includes a processor and a memory that is accessible by the processor. A user interface is stored within the memory and is executable by the processor. The memory further includes a user interface bundle embedded therein. Further, the user interface bundle includes a bundle risk level.

In still another embodiment, a system for downloading user interface components is provided and includes a security server and a stored application database that is accessible to an application download server and the security server. A user interface bundle can be stored within the stored application database. Also, the user interface bundle comprises a plurality of user interface components and a bundle risk level that is associated with an assigned risk that is further associated with downloading the user interface bundle to a wireless device.

In yet still another embodiment, a computer program is provided and is embedded within a computer readable medium. The computer program includes instructions to receive one or more user interface components. Moreover, the computer program includes instructions to determine a component risk level for each of the one or more received user interface components. The component risk level indicates a risk that is associated with executing a user interface component at a wireless device. The computer program also includes instructions to assign each of the one or more user interface components a determined component risk level.

In still yet another embodiment, a computer program is provided and is embedded within a computer readable medium. Particularly, the computer program includes instructions to receive a user interface bundle. The user interface bundle includes a data item that indicates the security risk of unbundling the user interface bundle at a wireless device.

In another embodiment, a user interface for a wireless device is provided and includes a menu of risk level thresholds. A first risk level threshold can be selected from the menu and file bundles that have a risk level below the first risk level threshold can be received at the wireless device.

In yet another embodiment, a user interface for a computer is provided and includes a menu of risk level thresholds. A first risk level threshold can be selected from the menu. The first risk level can be assigned to a file before the file is downloaded to a wireless device and executed at the wireless device.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a wireless device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform a certain action or "code operable to" perform the described action. The following detailed description describes methods, systems, software and apparatus used in connection with one or more wireless devices.

In one or more embodiments, a wireless device may utilize a runtime environment such as, a version of the Binary Runtime Environment for Wireless® (BREW®) platform developed by QUALCOMM, Inc., of San Diego, Calif. In at least one embodiment in the following description, the system used to provide communications between wireless devices and servers is implemented on a wireless device executing a runtime environment, such as the current version of the BREW® platform. However, one or more embodiments of the system used to provide communications between wireless devices and servers are suitable for use with other types of runtime environments that, for example, operate to control the execution of applications on wireless devices.

Figure 1:
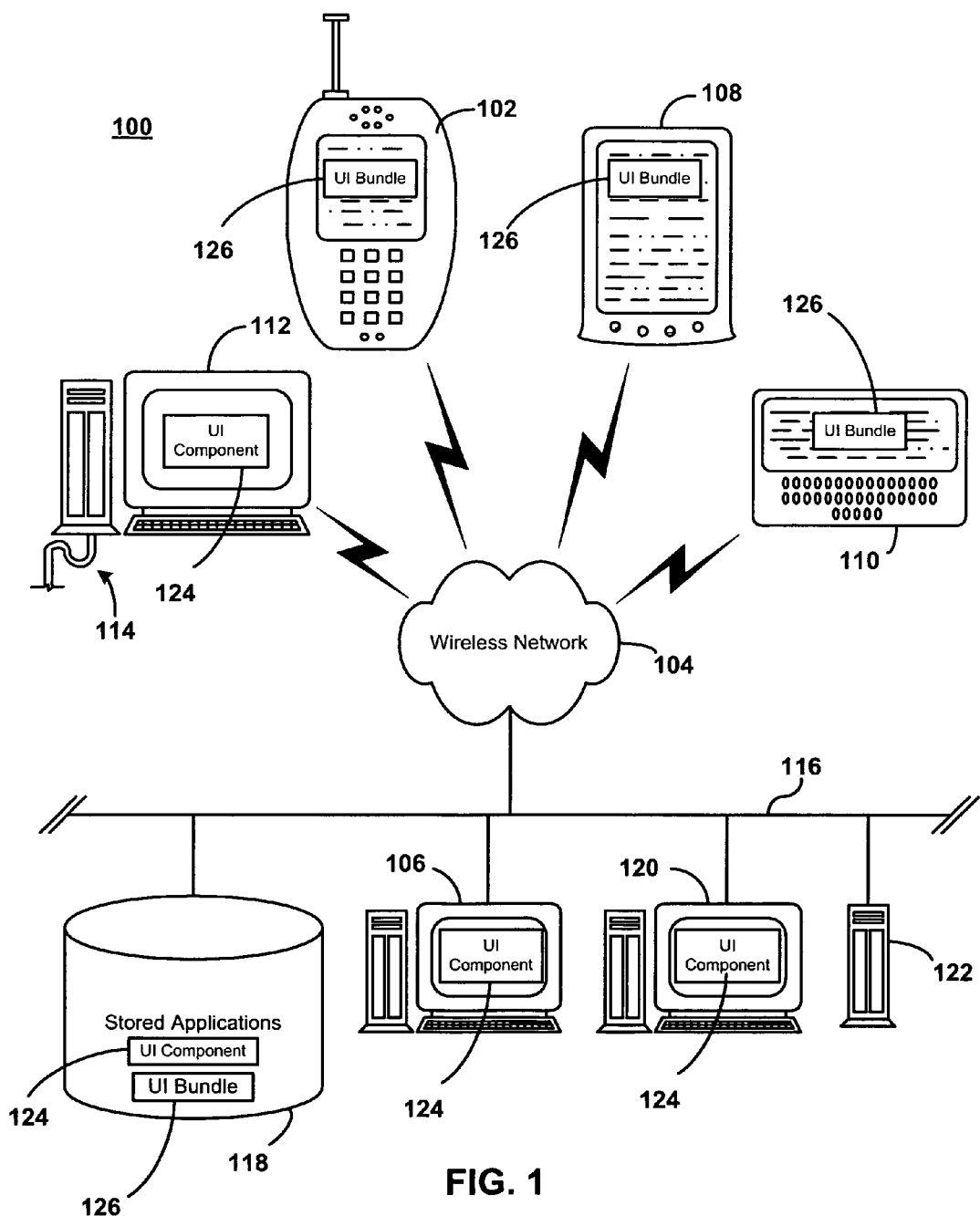
FIG. 1 is a general diagram of a particular embodiment of a system providing communications between a wireless device and a server.

FIG. 1 illustrates a block diagram of an exemplary, non-limiting embodiment of a system 100, that may perform loading, reloading, and deletion of software application components on a wireless device, such as wireless telephone 102. The wireless telephone 102 communicates across a wireless network 104 with at least one application download server 106. Further, the application download server 106 can selectively transmit one or more software applications and components to one or more wireless devices across a wireless communication portal or other node that has data access to the wireless network 104.

As illustrated in FIG. 1, the wireless device can be a wireless telephone 102, a personal digital assistant 108, a pager 110, or a separate computer platform 112 that has a wireless communication portal. In a particular embodiment, the pager 110 can be a two-way text pager. Further, in an alternative embodiment, the wireless device can have a wired connection 114 to a network or the Internet. The exemplary, non-limiting system can include any form of a remote module including a wireless communication portal, including without limitation, wireless modems, PCMCIA cards, personal computers, access terminals, telephones with or without a display or keypad, or any combination or sub-combination thereof.

As depicted in FIG. 1, the application download server 106 is coupled to a network 116 with other computer elements in communication with the wireless network 104. The system 100 includes a security server 120 and a stand-alone server 122, and each server can provide separate services and processes to the wireless devices 102, 108, 110, 112 across the wireless network 104. Further, as indicated in FIG. 1, the system 100 also includes at least one stored application database 118 that stores software applications that can be downloaded to the wireless devices 102, 108, 110, 112. Different embodiments are contemplated that locate logic to perform secure communications at any one or more of the application download server 106, the security server 120 and the stand-alone server 122.

In a particular embodiment, one or more user interface components 124 can be developed on a computer, e.g., the computer 112, and uploaded to the network 116 via the wireless network 104 or wired connection 114. Further, the user interface component 124 can be assigned a security risk level and signed with a digital signature that includes an embedded code that represents the risk level for the user interface component 124. In a particular embodiment, the risk level represents a risk of operating system damage associated with executing the user interface component 124 at a wireless device to which the user interface component 124 is downloaded. Thereafter, multiple digitally signed user interface components 124 can be bundled together to produce a user interface bundle 126 that can be stored within the stored applications database 118. The user interface bundle 126 can also be assigned a security risk level and signed with a digital signature that includes the risk level for the user interface bundle 126. Particularly, the risk level for the user interface bundle 126 represents a risk of system damage associated with unbundling the user interface bundle 126 at a wireless device to which the user interface bundle 126 is downloaded.

In an illustrative embodiment, the user interface component 124 can be a graphical user interface component, such as a graphical icon, a virtual button, a skin, a background, a font package, or a graphical menu that is linked to a physical user interface component, such as a keypad button, a keyboard button, or a mouse. The user interface component 124 can also be a collection of graphical user interface components, e.g., an entire graphical user interface. The user interface component 124 can also be a graphical user interface component such as a touch screen component that can be selected by touching the display screen of the wireless device with a finger or a stylus. Also, the user interface component 124 can be an entire touch screen user interface. Further, in another illustrative embodiment, the user interface component 124 can be a voice user interface component, such as a voice command linked to a particular function, such as dialing a telephone number. Moreover, the user interface component 124 can be an entire voice user interface having multiple voice commands and corresponding actions. In a particular embodiment, the user interface component 124 can upgrade an existing user interface component 124 at a wireless device, replace a previously loaded user interface component 124, or the user interface component 124 can be a new installation of a user interface component 124 for the wireless device.

In a particular embodiment, the risk levels for the user interface components 124 can be determined based on the type of user interface component 124, the type of wireless device to which the user interface component 124 is downloaded, and the extent of the changes to the user interface caused by executing the user interface component 124 at the wireless device. For example, simple font packages can be assigned a low risk, while a user interface component 124, such as a background or skin, can be assigned a medium risk. Further, a more pervasive user interface component 124, such as an entirely new user interface that changes the functionality of the wireless device in addition to the appearance of the wireless device, can be assigned a high risk.

Additionally, the risk levels for the user interface components 124 can be determined based on whether the developer is an approved or trusted developer, i.e., a developer that has a proven track record of producing user interface components 124 that work as intended, execute without problems, and do not prevent the wireless device from operating properly. Further, a developer that is trusted is deemed to be privileged to develop user interface components that can be downloaded to wireless devices. In a particular embodiment, a developer can gain approval by paying a fee. Also, in a particular embodiment, the risk levels can be assigned by a particular wireless device manufacturer, an industry group, or some other group.

In a particular embodiment, the risk may be automatically assigned for a developer without the developer's input or consent. Also, the risk can be assigned based on how long a particular developer has been involved in a particular project. For example, developers that joined the development earlier in the development path may be assigned less risk than new or upcoming developers. Further, the risk can be assigned based on when a component is developed or when a component is to be delivered. Additionally, as a particular user interface component or bundle is developed the risk level may change depending on the various developers that have "handled" the particular user interface component or bundle. Risk levels for subsequent handlers may be automatically determined.

Accordingly, a particular user interface component 124 can have one of the following exemplary, non-limiting risk levels: low and trusted, low and unapproved, medium and trusted, medium and unapproved, high and approved, and high and unapproved. In a particular embodiment, the risk level for a user interface bundle 126 is determined based on a combination of the risk levels of the individual user interface components in the bundle. The digital signatures ensure that the risk levels are able to be controlled and enforced. Further, the digital signatures prevent tampering with the user interface components once they are assigned a risk level and digitally signed.

Figure 2:
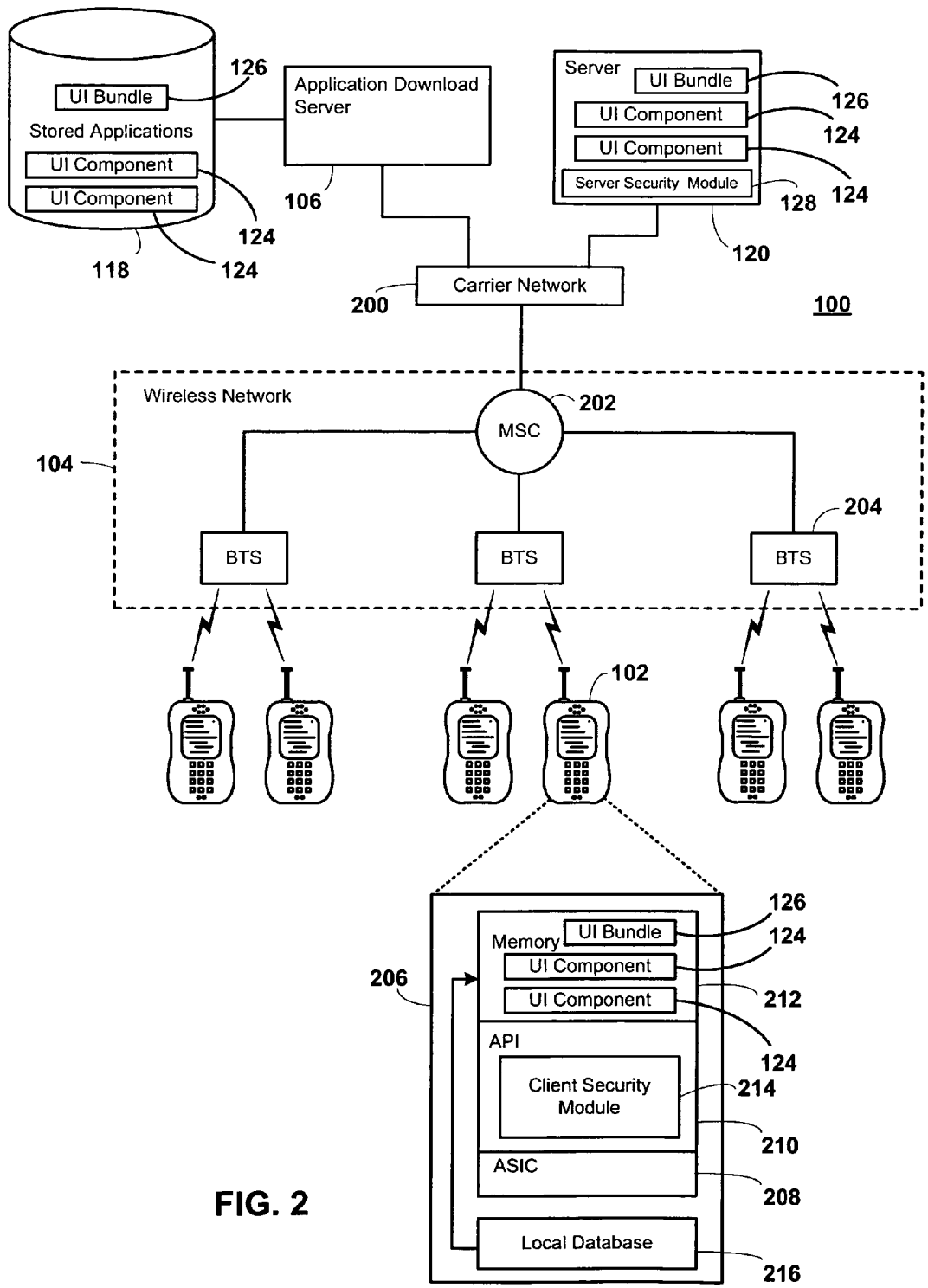
FIG. 2 is a general diagram that illustrates further details of the particular embodiment of the system of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, are compatible with wireless communication services and can communicate with a carrier network 200 through a data link, such as the Internet, a secure LAN, WAN, or other network. In an illustrative embodiment, the server 120 contains a server security module 128 that further contains logic configured to provide for secure communications over the carrier network 200. In a particular embodiment, the server security module 128 can operate in conjunction with a client security module located on a wireless device, such as wireless devices 102, 108, 110, 112, to provide secure communications. Additionally, the server security module 128 can assign risk levels to user interface components 124 sent to the security server 120. Also, the server security module 128 can assign risk levels to the user interface bundles 126.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS transfers voice information. The MSC 202 is connected to multiple base transceiver stations ("BTS") 204. The MSC 202 can be connected to the BTS 204 by both a data network and/or Internet for data transfer and POTS for voice information. The BTS 204 ultimately broadcasts messages wirelessly to the wireless devices, such as to wireless telephone 102, by the short messaging service ('SMS"), or other over-the-air methods known in the art.

The wireless device 102 has a computer platform 206 that can receive and execute software applications transmitted from the application download server 106. In an illustrative embodiment, the computer platform 206 may be implemented as an application-specific integrated circuit (ASIC 208), a processor, microprocessor, logic circuit, or other data processing device. The ASIC 208 can be installed at the time of manufacture of the wireless device. Further, the ASIC 208 or other processor can execute an application programming interface (API) 210 layer that interfaces with resident programs in the memory 212 of the wireless device. In a particular embodiment, the API 210 layer includes a set of APIs provided by the Binary Runtime Environment for Wireless® (BREW®) platform. The memory 212 can be comprised of read-only or random-access memory (ROM or RAM), EEPROM, flash memory, or any other memory suitable for computer platforms.

The API 210 also includes a client security module 214 containing logic configured to provide for secure communications over the carrier network 200. In a particular embodiment, the client security module 214 can operate in conjunction with the server security module 128 to provide secure communications. Additionally, the client security module 214 can detect and decode the digital signatures of user interface components 124 and user interface bundles 126 downloaded to the wireless device and can determine the assigned risk levels of a user interface bundle 126 and each of the user interface components 124.

Also, the client security module 214 can compare the risk level for each user interface bundle 126 and the risk level for each user interface component 124 to a predetermined threshold level, e.g., a threshold level for specific user interface components 124 or a global threshold level for a user interface bundle 126, in order to determine whether the risk level is below a preset threshold. If the risk level for the user interface bundle 126 is below the bundle threshold level, the user interface bundle 126 is unbundled to produce multiple user interface components 124. Further, if the risk level for a user interface component 124 is below the component threshold level, each user interface component 124 can be executed at the wireless device. On the other hand, if the risk level for a user interface component 124 is above the component threshold level the user interface component 124 can be deleted, or otherwise removed, from the wireless device.

As illustrated in FIG. 2, the computer platform 206 can further include a local database 216 that can hold applications not actively used in memory 212. In an illustrative embodiment, the local database 216 is stored within a flash memory cell, but it can be stored within any secondary storage device as known in the art, such as magnetic media, EEPROM, optical media, tape, or floppy or hard disk. A wireless device, for example, the wireless telephone 102, can download one or more software applications, such as games, news, stock monitors, and the like, from the application download server 106. Further, the wireless device can store the downloaded applications in the local database 216, when not in use, and can load stored resident applications from the local database 216 to memory 212 for execution by the API 210 when desired by the user. Further, communications over the wireless network 104 may be performed in a secure manner, at least in part, due to the interaction and operation of the client security module 214 and the server security module 128.

Figure 3:
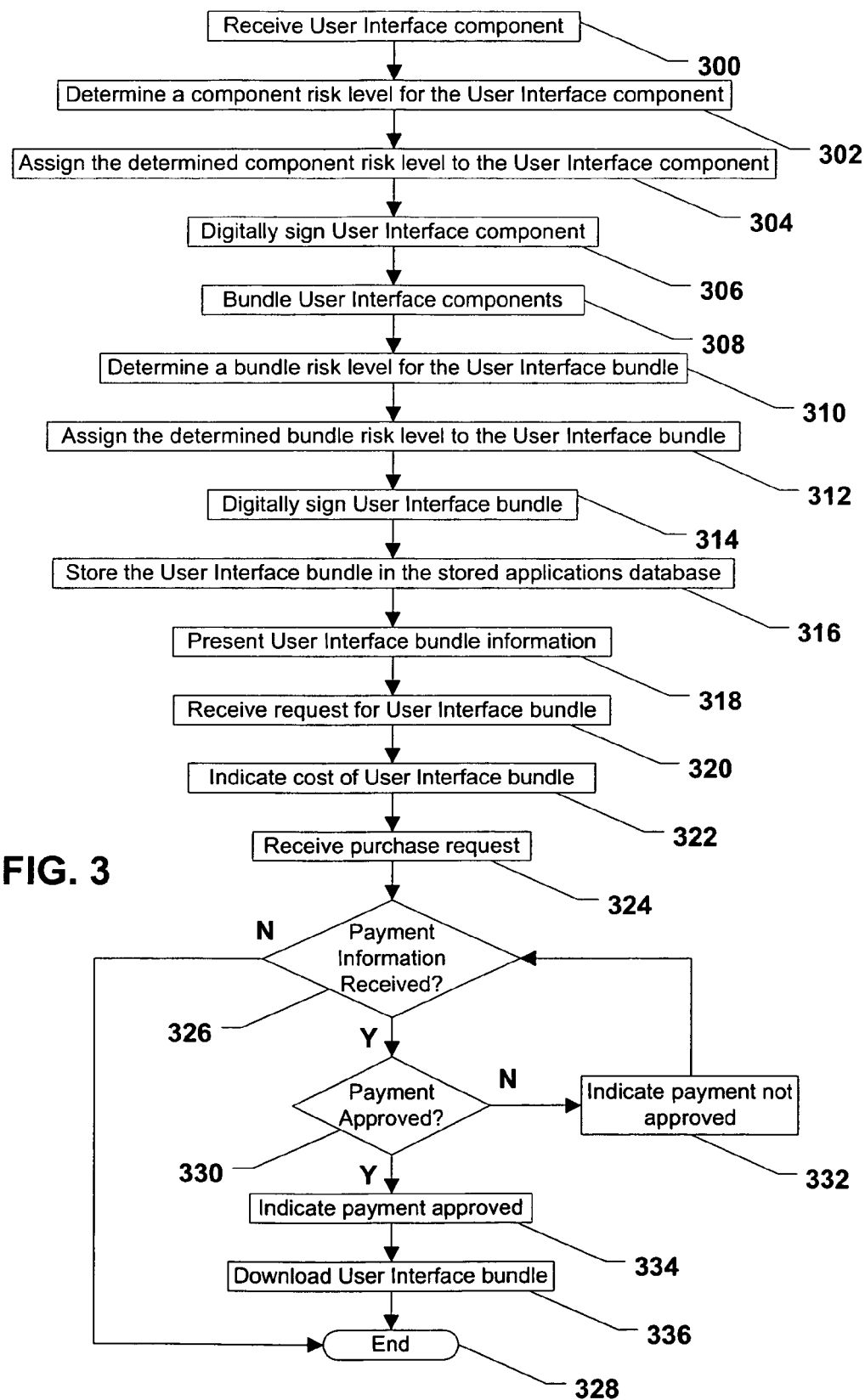
FIG. 3 is a flowchart illustrating a method of providing user interface components to a wireless device.

Referring to FIG. 3, a method of providing user interface components to a wireless device is shown and commences at block 300 wherein a security server receives a user interface component, e.g., from a software developer. At block 302, a server security module within a security server determines a component risk level for the user interface component. Thereafter, at block 304, the server security module assigns the determined component risk level to the user interface component. Moving to block 306, the server security module digitally signs the user interface component. In a particular embodiment, the digital signature can prevent tampering with the risk level and the user interface component.

Continuing to block 308, the server security module combines plural user interface components together to create a user interface bundle. At block 310, the server security module determines a bundle risk level for the user interface bundle. Then, at block 312, the server security module assigns the determined bundle risk level to the user interface bundle. At block 314, the server security module digitally signs the user interface bundle. In an illustrative embodiment, the server security module digitally signs the user interface bundle using an embedded risk code that indicates the assigned risk level generated and stored with a data packet associated with the user interface bundle to be deployed to a wireless device.

Proceeding to block 316, the security server stores the digitally signed user interface bundle in the stored applications database. Next, at block 318, the application download server presents user interface bundle information to a user via the wireless device. In a particular embodiment, the application download server presents a menu of digitally signed user interface bundles and information related to each digitally signed user interface bundle. In a particular embodiment, the information includes the bundle risk level for the user interface bundle, the component risk level for each user interface component that is included in the user interface bundle, and the type of each user interface component that is included in the user interface bundle.

Still referring to FIG. 3, at block 320, the application download server receives a request for a user interface bundle from a wireless device. In a particular embodiment, the request from the wireless device is received at the application download server via an over the air interface. At block 322, the application download server indicates the cost of the user interface bundle to the wireless device. At block 324, the application download server receives a purchase request from the wireless device. Moving to decision step 326, the application download server 106 determines whether payment information is received from the wireless device. If not, the method ends at state 328. On the other hand, if payment information is received from the wireless device, the method proceeds to decision step 330 and the application download server determines whether the payment from the wireless device is approved. If the payment is not approved, the method continues to block 332 and the application download server indicates to the wireless device that the payment is not approved. The method then returns to decision step 326 and continues as described herein.

At decision step 330, if the application download server approves the user payment, the logic proceeds to block 334 and the application download server indicates to the wireless device that the payment from the wireless device is approved. Next, at block 336, the application download server downloads the user interface bundle to the wireless device. In a particular embodiment, the user interface bundle is downloaded to the wireless device via an over the air interface. The method of downloading the user interface bundle with an assigned risk level from an application download server ends at state 328.

Figure 4:
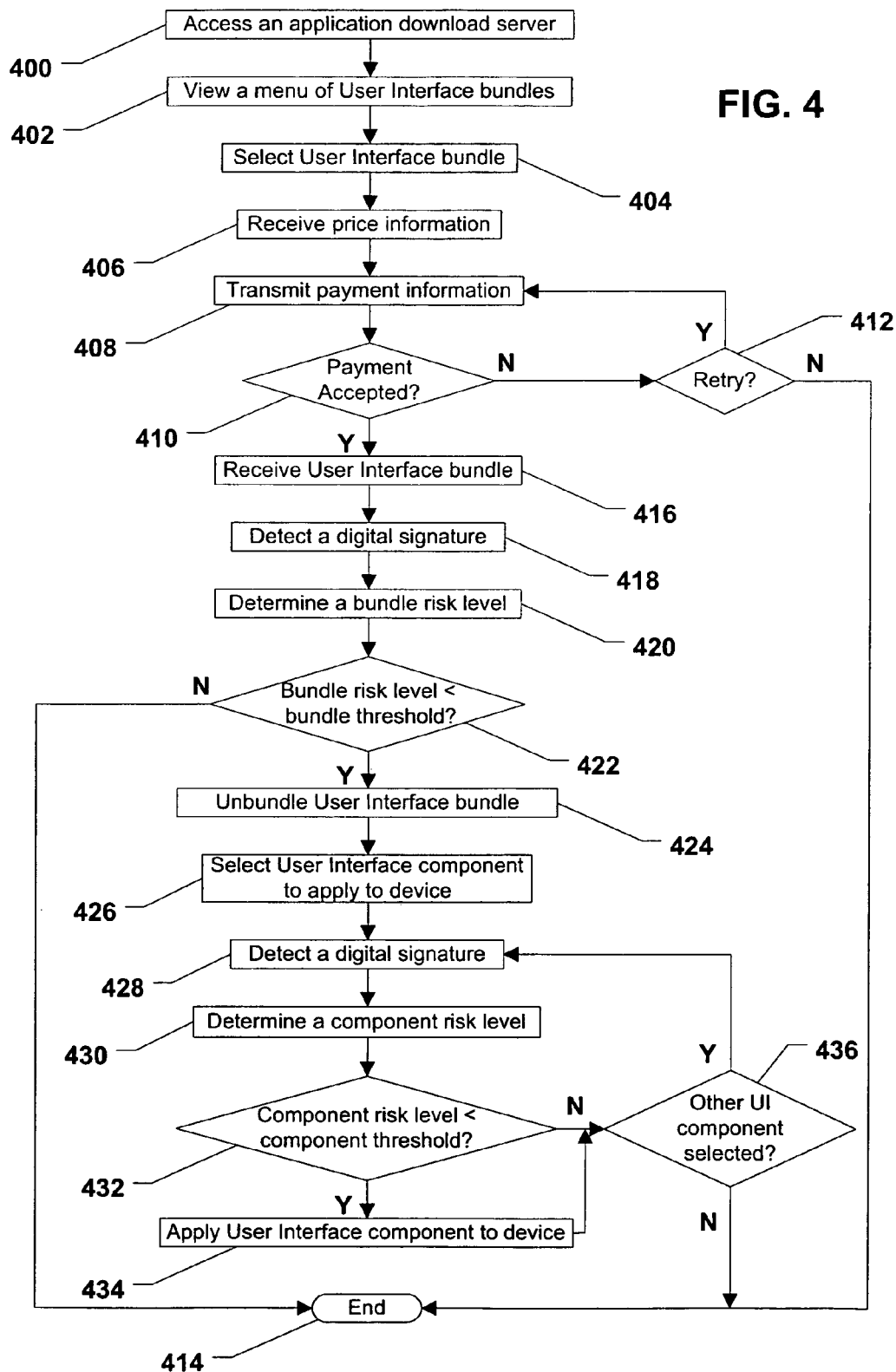
FIG. 4 is a flowchart illustrating a method of receiving user interface components at a wireless device.

Referring now to FIG. 4, a method of receiving user interface components having assigned risk levels at a wireless device is shown and commences at block 400. At block 400, a wireless device accesses the application download server. In a particular embodiment, the wireless device can communicate with the application download server via an over the air interface. Next, at block 402, a user of the wireless device can view a menu of user interface bundles that are available at the application download server. At block 404, using the wireless device, the user can select a user interface bundle to be downloaded by the application download server. At block 406, the wireless device receives price information related to the user interface bundle.

Moving to block 408, the wireless device can transmit payment information to the application download server. Thereafter, at decision step 410, the application download server indicates to the wireless device whether the payment is accepted. If the payment is not accepted, the method continues to decision step 412 and queries the user via the wireless device as to whether the user would like to retry payment. If so, the method returns to block 408 and new payment information is transmitted to the application download server. The method then continues as described herein.

At decision step 412, if the user does not want to retry payment, the method ends at state 414. Returning to decision step 410, if payment is accepted, the wireless device receives the user interface bundle at block 416. Moving to block 418, a digital signature associated with the user interface bundle is detected and decoded. At block 420, a bundle risk level is determined, such as by reading the embedded risk level code assigned by the security server. Continuing to decision step 422, the wireless device compares the bundle risk level to a bundle risk level threshold in order to determine whether the bundle risk level is acceptable, i.e., less than the bundle threshold. If the bundle risk level is not less than the bundle threshold, the risk level is too high so the bundle is rejected and the method ends at state 414.

Conversely, if the bundle risk level is less than the bundle threshold, the method moves to block 424 and the user interface bundle is accepted and unbundled to produce multiple user interface components. At block 426, the wireless device detects the selection of one or more user interface components to be applied to the wireless device. In another embodiment, the wireless device can automatically determine which user interface components to be applied to the wireless device. Next, at block 428, a digital signature associated with the user interface component is detected and decoded. At block 430, a component risk level is determined for the user interface component. Proceeding to decision step 432, the wireless device compares the component risk level to a component risk level threshold in order to determine whether the component risk level is acceptable, i.e., less than the component threshold. In a particular embodiment, the risk level thresholds can be set by a wireless device manufacturer. Also, the risk level thresholds can be set by a user of the wireless device.

If the component risk level is less than the component risk level threshold, the component is accepted and the method moves to block 434 where the user interface component is applied to the wireless device. In a particular embodiment, the user interface component may be an upgrade to an existing user interface. In another embodiment, the user interface component is a new component that is applied to the wireless device. The logic then moves to decision step 436.

Returning to decision step 432, if the component risk level is not less than the component threshold, the method moves to decision step 436. At decision step 436, the wireless device determines whether there is another user interface component selected for application to the wireless device. If so, the method returns to block 428 and continues as described above. If no other user interface components are available, the method ends at state 414. In a particular embodiment, the decision to unbundle a user interface bundle and the decision to apply a user interface component to the wireless device can be made by logic within the wireless device without the user's input or knowledge. Otherwise, the user can select and/or set a threshold for each decision. Also, the decision to unbundle and the decision to apply can be based on the cause of the download, e.g., was the download automatic or requested by a user.

Figure 5:
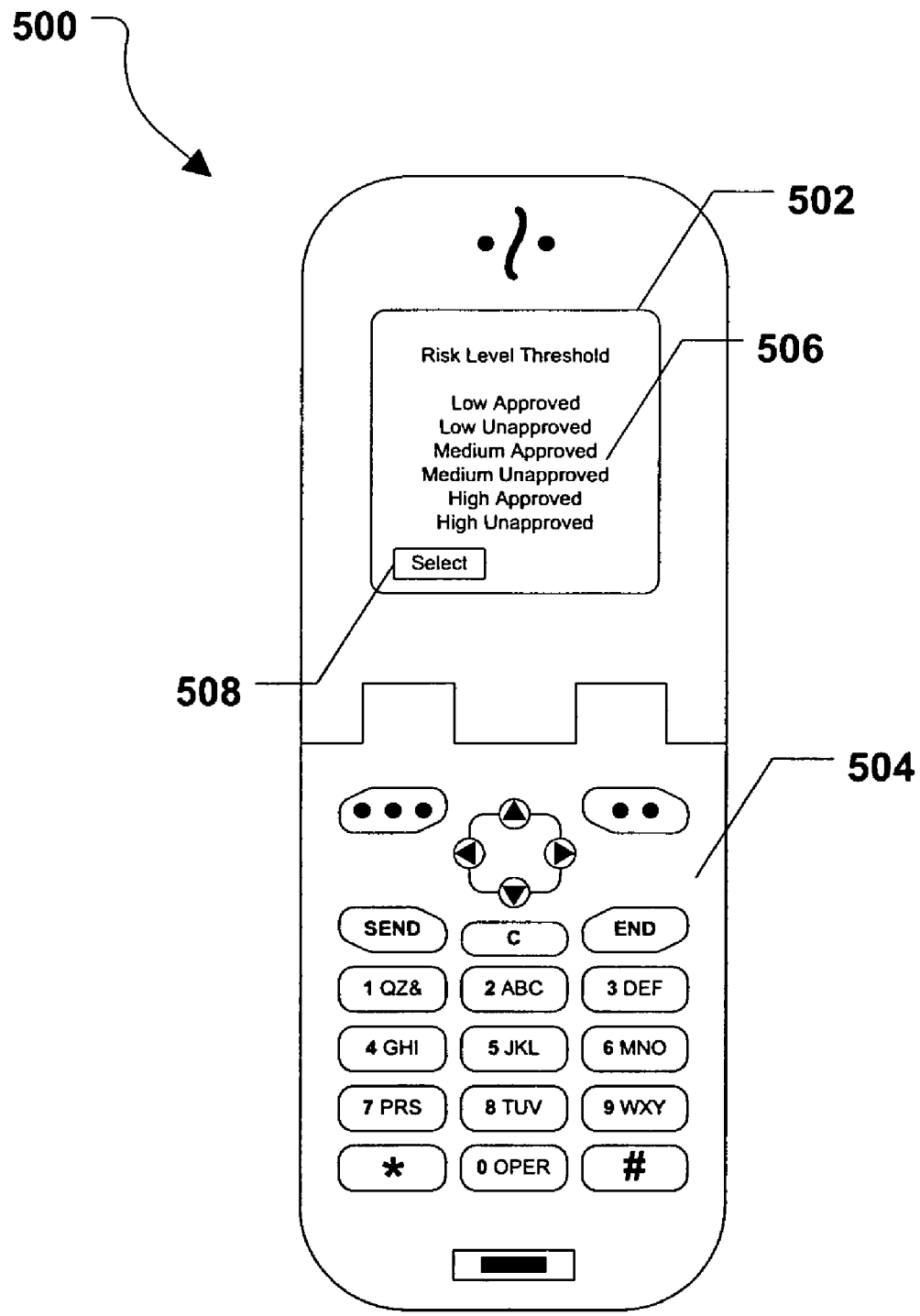
FIG. 5 is a diagram of a wireless device showing a first user interface.

FIG. 5 shows a wireless device, generally designated 500. As depicted in FIG. 5, the wireless device includes a display 502 and a keypad 504. FIG. 5 indicates that a download/execution threshold menu 506 can be presented to a user via the display 502. A user can scroll through the download/execution threshold menu 506 using the keypad 504 and then, using the keypad 504 or a soft button 508, select a particular threshold. In a particular embodiment, the threshold can apply to downloading user interface bundles to the wireless device 500 and to executing user interface components at the wireless device 500. Alternatively, a user can select a first threshold for downloading user interface bundles to the wireless device 500 and a second threshold for executing user interface components at the wireless device 500.

Figure 6:
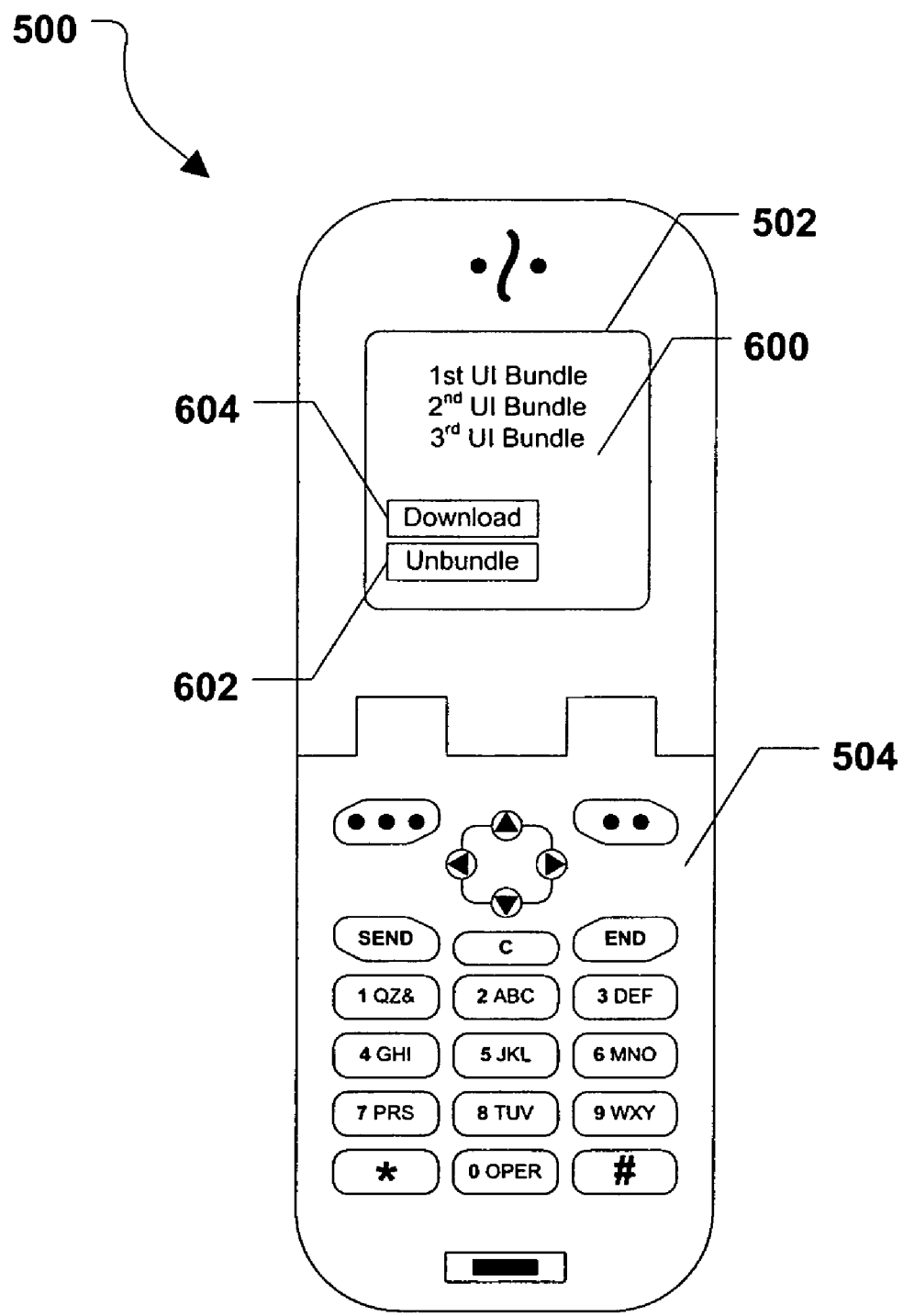
FIG. 6 is a diagram of the wireless device showing a second user interface.
Figure 7:
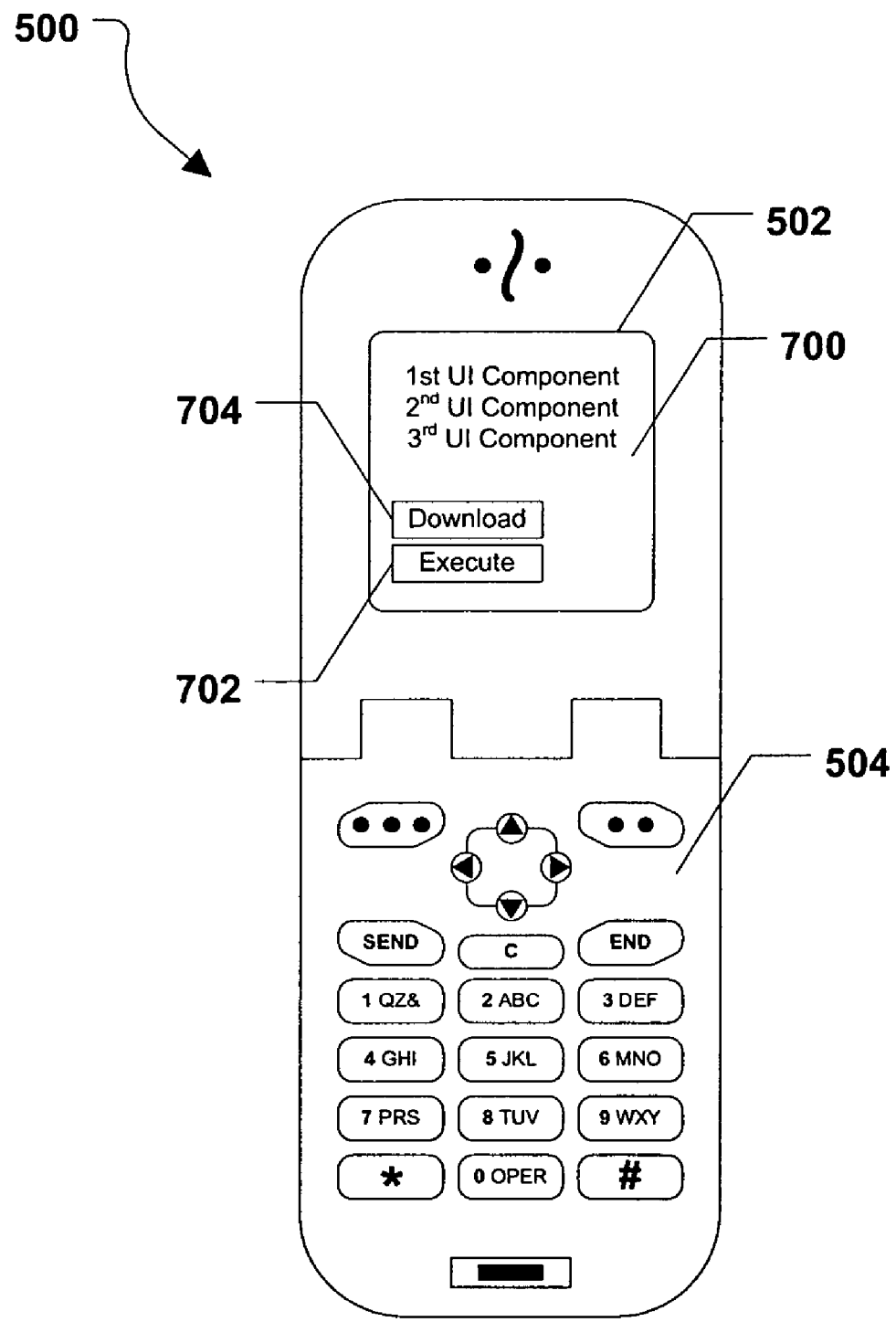
FIG. 7 is a diagram of the wireless device showing a third user interface.

FIG. 6 shows that a menu of user interface bundles 600 can be displayed at the wireless device 500. A user can scroll through the menu of user interface bundles 600 using the keypad 504 and then, using the keypad 504 or a first soft button 602, the user can select a particular user interface bundle to unbundle at the wireless device 500. Also, the user can select a particular user interface bundle from the menu 600 and toggle a second soft button 604 to cause the particular user interface bundle to be downloaded to the wireless device 500. Also, as indicated in FIG. 7, a menu of user interface components 700 can be displayed at the wireless device 500. A user can scroll through the menu of user interface components 700 using the keypad 504 and then, using the keypad 504 or a first soft button 702, select a particular user interface component to execute at the wireless device 500. The user can also download a particular user interface component presented at via the menu 700 by toggling a second soft button 704.

Figure 8:
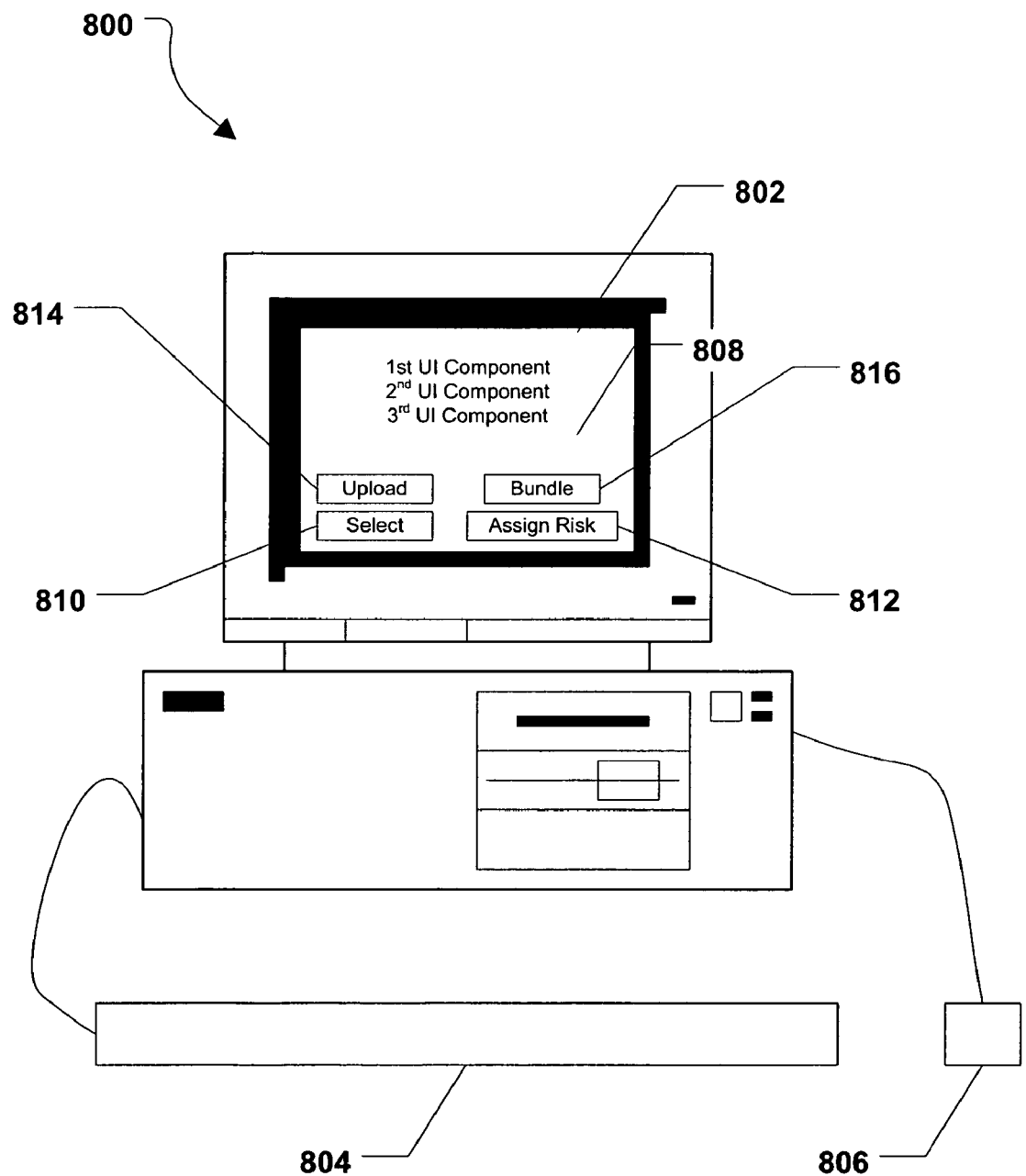
FIG. 8 is a diagram of a computer showing a first user interface.

FIG. 8 shows a computer, generally designated 800. As depicted in FIG. 8, the computer includes a display 802, a keyboard 804, and a mouse 806. FIG. 8 indicates that a user interface component menu 808 can be presented to a user via the display 802. A user can select one or more user interface components from the menu 808 by clicking on a first soft button 810 with the mouse 806. Further, the user can assign a risk level to a selected user interface component by clicking on a second soft button 812 to bring up a risk level menu. The user can also upload a selected user interface component to an application download server by toggling on a third soft button 814. Additionally, the user can bundle multiple selected user interface components by clicking on a fourth soft button 816.

Figure 9:
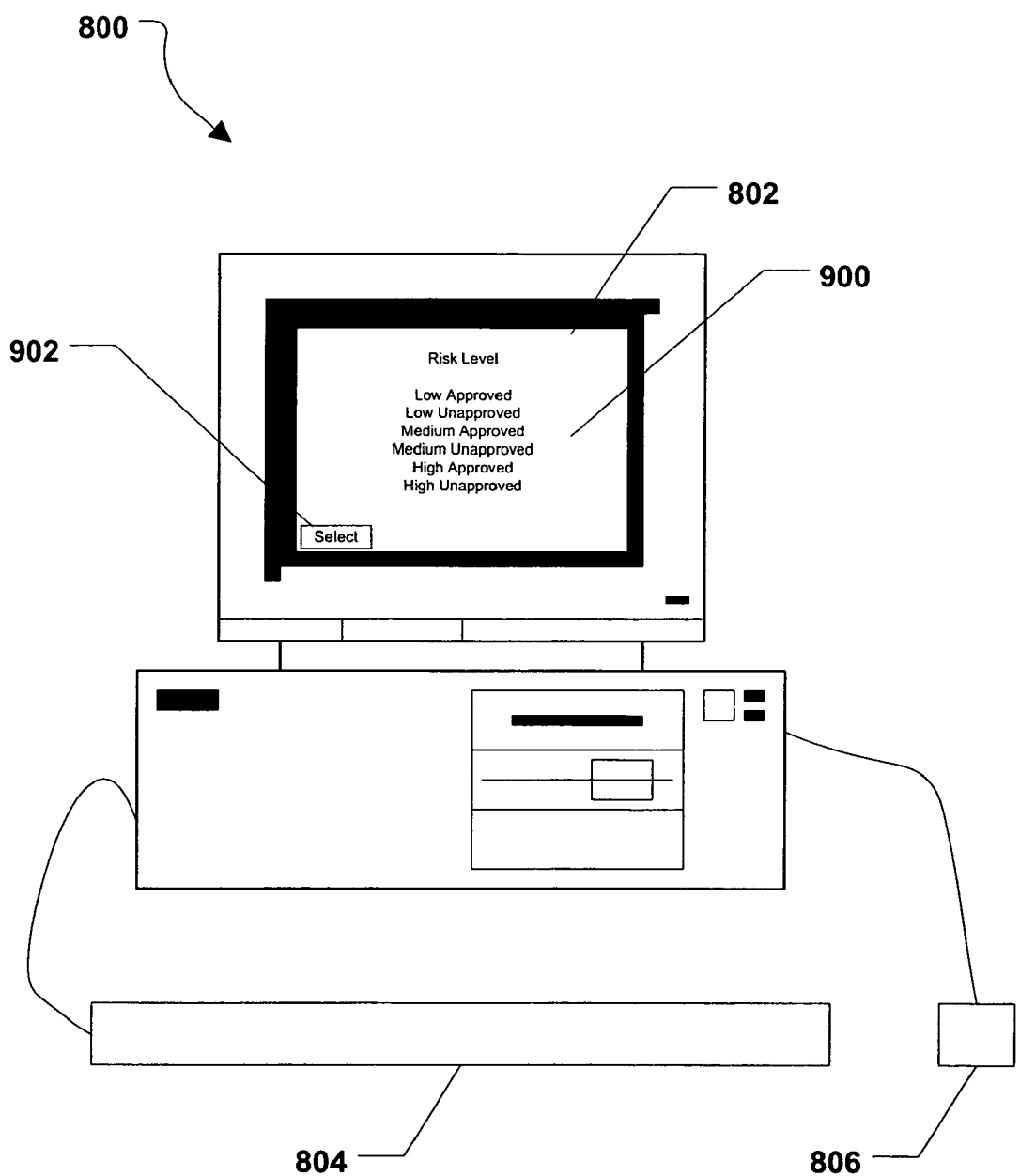
FIG. 9 is a diagram of the computer showing a second user interface.
Figure 10:
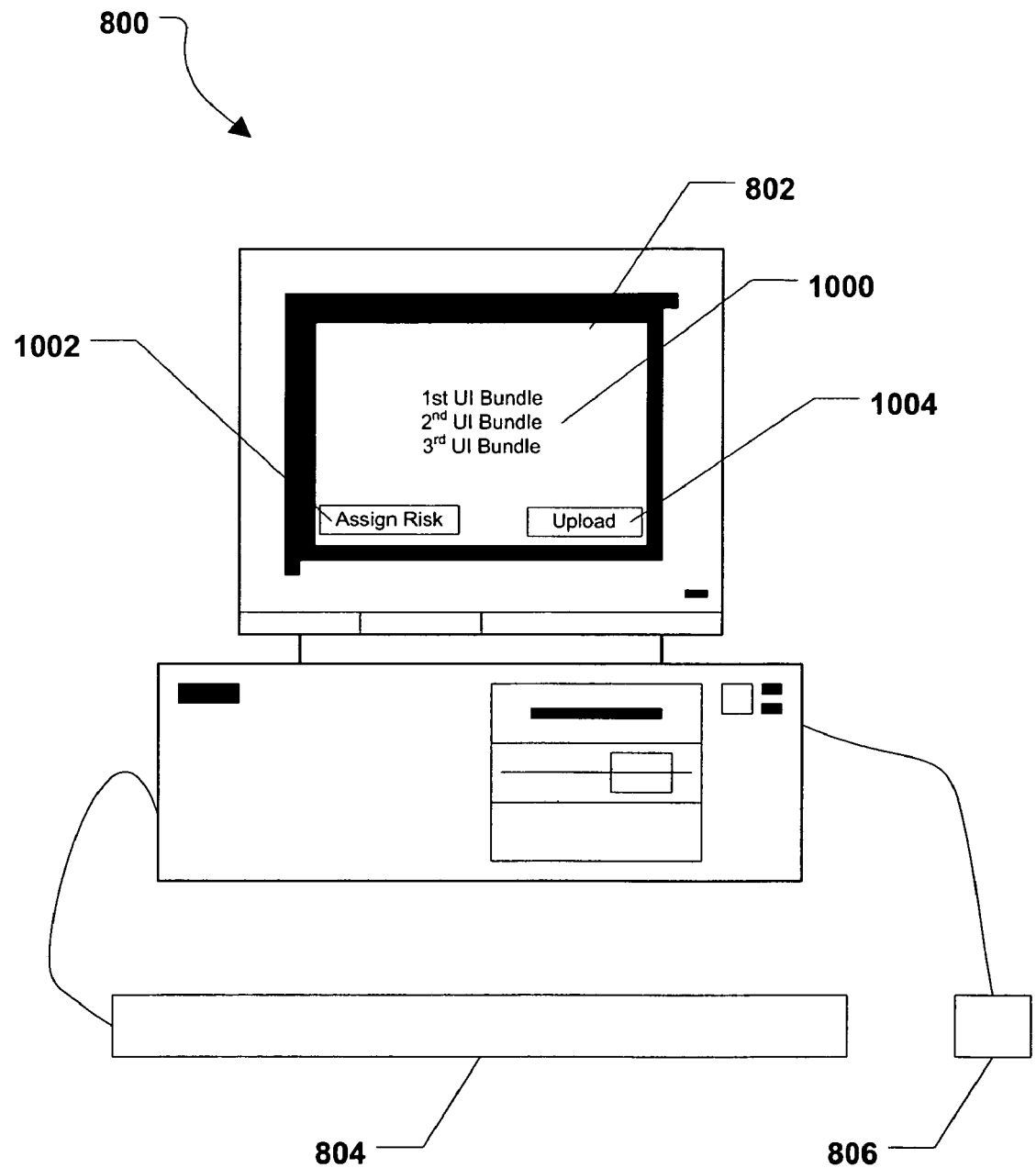
FIG. 10 is a diagram of the computer showing a third user interface.

FIG. 9 shows a risk level menu 900 that can be presented at the computer. A user can select a risk level by clicking on a select button 902 with the mouse 806. Referring to FIG. 10, a user interface bundle menu 1000 can be presented to a user via the display 802. A user can select assign a risk level to a particular user interface bundle by selecting the particular user interface bundle from the menu 1000 and then, clicking on a first soft button 1002 with a mouse 806. When the first soft button 1002 is toggled, the risk level menu 900 is, again, presented to the user at the computer 800. The user can also upload a selected user interface bundle to an application download server by clicking, or otherwise toggling, a second soft button 1004 presented to the user at the computer 800.

With the configuration of structure described above, the system and method of downloading user interface components to wireless devices provides a method for a wireless device to determine a risk level associated with executing one or more user interface components prior to execution. Accordingly, user interface components that appear to present a greater security risk can be rejected by the wireless device.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device or a user terminal. In the alternative, the processor and the storage medium may reside as discrete components in a wireless device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of processing a user interface component, the method comprising: receiving one or more user interface components to be communicated to a wireless device, wherein the one or more user interface components is selected from a group consisting of a graphical user interface component, a voice user interface component, and a touch screen user interface component; determining a component risk level for each of the one or more user interface components, wherein each component risk level is determined at least partially based on an extent of changes to an appearance of a user interface on a display of the wireless device caused by executing the user interface component at the wireless device; and assigning a determined component risk level to each of the one or more user interface components.

2. The method of claim 1, further comprising digitally signing each of the one or more user interface components using an embedded risk code that indicates the assigned risk level.

3. The method of claim 1, wherein the component risk level is selected from a plurality of component risk levels.

4. The method of claim 1, wherein the component risk level is determined at least partially based on a type of each user interface component.

5. The method of claim 1, wherein the component risk level is determined at least partially based on a developer of each user interface component.

6. The method of claim 5, wherein a lower risk level is assigned to each user interface component that is developed by an approved developer.

7. The method of claim 5, wherein a higher risk level is assigned to each user interface component that is developed by an unapproved developer.

8. The method of claim 1, further comprising downloading the one or more user interface components to a wireless device.

9. The method of claim 1, further comprising bundling multiple user interface components to generate a user interface bundle.

10. The method of claim 9, further comprising determining a bundle risk level for the user interface bundle.

11. The method of claim 10, wherein the bundle risk level is determined at least partially based on each component risk level of user interface components within the user interface bundle.

12. The method of claim 11, further comprising digitally signing the user interface bundle.

13. The method of claim 12, further comprising downloading the user interface bundle to the wireless device.

14. The method of claim 13, further comprising charging a fee to download the user interface bundle to the wireless device.

15. The method of claim 14, wherein the user interface bundle is downloaded to the wireless device via an over the air interface.

16. A method of obtaining user interface components at a wireless device, comprising: accessing a download server; and receiving a user interface bundle comprising one or more user interface components from the download server, the user interface bundle including a bundle risk level associated with loading the user interface bundle onto the wireless device, wherein the bundle risk level is determined at least partially based on an extent of changes to an appearance of a user interface on a display of the wireless device caused by executing the user interface bundle on the wireless device, wherein the one or more user interface components is selected from a group consisting of a graphical user interface component, a voice user interface component, and a touch screen user interface component.

17. The method of claim 16, further comprising selecting the user interface bundle from a menu of available user interface bundles prior to receiving the user interface bundle.

18. The method of claim 16, further comprising detecting and decoding a bundle digital signature of the user interface bundle received from the download server.

19. The method of claim 18, further comprising determining the bundle risk level after decoding the bundle digital signature of the user interface bundle.

20. The method of claim 19, further comprising comparing the bundle risk level to a bundle threshold.

21. The method of claim 20, further comprising unbundling the user interface bundle to produce a plurality of user interface components after comparing the bundle risk level to the bundle threshold.

22. The method of claim 21, wherein each of the plurality of user interface components has a component digital signature and a component risk level associated with loading the respective user interface component onto the wireless device.

23. The method of claim 22, further comprising detecting the component digital signature of at least one user interface component.

24. The method of claim 22, further comprising comparing at least one component risk level to a component risk level threshold.

25. The method of claim 24, further comprising selectively applying one or more of the plurality of user interface components to the wireless device at least partially based on a result of comparing the component risk level to the component threshold.

26. A wireless device, comprising: a processor; a memory accessible by the processor; a display coupled to the processor; and a user interface bundle comprising one or more user interface components embedded within the memory, the user interface bundle having a bundle risk level, wherein the bundle risk level is determined at least partially based on an extent of changes to an appearance of a user interface on the display caused by executing the user interface bundle at the wireless device, wherein the one or more user interface components is selected from a group consisting of a graphical user interface component, a voice user interface component, and a touch screen user interface component.

27. The wireless device of claim 26, wherein a menu of user interface component bundles is presented to a user via the display before a selected user interface bundle is downloaded to the wireless device and stored within the memory.

28. The wireless device of claim 27, wherein each user interface component includes a component risk level associated with execution of the user interface component by the processor.

29. A system for downloading user interface components, comprising: a security server; a stored application database accessible to an application download server; and at least one user interface bundle stored within the stored application database, wherein the user interface bundle comprises one or more user interface components and a bundle risk level associated with an assigned risk associated with executing the user interface bundle at a wireless device, wherein the bundle risk level is determined at least partially based on an extent of changes to an appearance of a user interface on a display of the wireless device caused by executing the user interface bundle at the wireless device, and wherein each of the one or more user interface components is selected from a group consisting of a graphical user interface component, a voice user interface component, and a touch screen user interface component.

30. The system of claim 29, further comprising a security server coupled to the stored application database and a server security module embedded within the security server, the server module including a first computer program, the first computer program including instructions to receive the one or more user interface components.

31. The system of claim 30, further comprising an application download server and second computer program within the application download server, the computer program comprising instructions to communicate the one or more user interface components to a wireless device.

32. A non-transitory computer readable storage medium having stored thereon processor executable software instructions configured to cause a processor to perform operations comprising: receiving one or more user interface components; determining a component risk level for each of the one or more received user interface components, the component risk level indicating a risk associated with executing a user interface component at a wireless device, wherein each component risk level is determined at least partially based on an extent of changes to an appearance of a user interface on a display of the wireless device caused by executing the user interface component at the wireless device; and assigning each of the one or more user interface components a determined component risk level, wherein the one or more user interface components is selected from a group consisting of a graphical user interface component, a voice user interface component, and a touch screen user interface component.

33. A non-transitory computer readable storage medium having stored thereon processor executable software instructions configured to cause a processor to perform operations comprising: receiving a user interface bundle comprising one or more user interface components, the user interface bundle including a data item indicating a security risk of unbundling the user interface bundle at a wireless device, wherein the security risk is determined at least partially based on an extent of changes to an appearance of a user interface on a display of the wireless device caused by executing the user interface bundle at the wireless device, wherein the one or more user interface components is selected from a group consisting of a graphical user interface component, a voice user interface component, and a touch screen user interface component.

34. An electronic device for processing a user interface component, comprising: means for receiving one or more user interface components to be communicated to a wireless device; means for determining a component risk level for each of the one or more user interface components, wherein each component risk level is determined at least partially based on an extent of changes to an appearance of a user interface on a display of the wireless device caused by executing the user interface component at the wireless device; and means for assigning a determined component risk level to each of the one or more user interface components, wherein the one or more user interface components is selected from a group consisting of a graphical user interface component, a voice user interface component, and a touch screen user interface component.

35. A wireless device, comprising: means for accessing a download server; and means for receiving a user interface bundle comprising one or more user interface components from the download server, the user interface bundle comprising one or more user interface components and a bundle risk level associated with loading the user interface bundle onto the wireless device wherein the bundle risk level is determined at least partially based on an extent of changes to an appearance of a user interface on a display of the wireless device caused by executing the user interface bundle at the wireless device, wherein the one or more user interface components is selected from a group consisting of a graphical user interface component, a voice user interface component, and a touch screen user interface component.

36. The wireless device of claim 35, further comprising means for selecting the user interface bundle from a menu of available user interface bundles prior to receiving the user interface bundle.

37. The wireless device of claim 35, further comprising means for detecting and decoding a bundle digital signature of the user interface bundle received from the download server.

38. The wireless device of claim 37, further comprising means for determining the bundle risk level after decoding the bundle digital signature of the user interface bundle.

39. The wireless device of claim 38, further comprising means for comparing the bundle risk level to a bundle threshold.

40. The wireless device of claim 39, further comprising means for unbundling the user interface bundle to produce a plurality of user interface components after comparing the bundle risk level to the bundle threshold.

41. The wireless device of claim 40, wherein each of the plurality of user interface components has a component digital signature and a component risk level associated with loading the respective user interface component onto the wireless device.

42. The wireless device of claim 41, further comprising means for detecting the component digital signature of at least one user interface component.

43. The wireless device of claim 41, further comprising means for comparing at least one component risk level to a component risk level threshold.

44. The wireless device of claim 43, further comprising means for selectively applying one or more of the plurality of user interface components to the wireless device at least partially based on a result of comparing the component risk level to the component threshold.

45. The wireless device of claim 35, wherein the risk level further comprises one of a plurality of different risks levels, wherein each of the plurality of different risk levels varies based on an extent of the changes to the appearance of the user interface on the display of the wireless device caused by executing the user interface bundle at the wireless device.

46. The wireless device of claim 35, wherein the risk level is at least partially based on how long a developer of the user interface component has been involved in development of the user interface component.

47. The wireless device of claim 35, wherein the risk level further comprises a changed risk level changed during development of the user interface component at least partially based on a plurality of developers who have handled the user interface component in the development.

48. The method of claim 1, wherein determining the component risk level further comprises determining one of a plurality of different risks levels, wherein each of the plurality of different risk levels varies based on an extent of the changes to the appearance of the user interface on the display of the wireless device caused by executing the user interface component at the wireless device.

49. The method of claim 1, wherein determining the component risk level further comprises determining at least partially based on how long a developer of the user interface component has been involved in development of the user interface component.

50. The method of claim 1, wherein determining the component risk level further comprises changing the risk level during development of the user interface component at least partially based on a plurality of developers who have handled the user interface component in the development.

51. The method of claim 16, wherein the risk level further comprises one of a plurality of different risks levels, wherein each of the plurality of different risk levels varies based on an extent of the changes to the appearance of the user interface on the display of the wireless device caused by executing the user interface bundle at the wireless device.

52. The method of claim 16, wherein the risk level is at least partially based on how long a developer of each user interface component has been involved in development of the user interface component.

53. The method of claim 16, wherein the risk level further comprises a changed risk level changed during development of each user interface component at least partially based on a plurality of developers who have handled the user interface component in the development.

54. The wireless device of claim 26, wherein the processor is further configured to detect and decode a bundle digital signature of the user interface bundle received from the download server.

55. The wireless device of claim 54, wherein the processor is further configured to determine the bundle risk level after decoding the bundle digital signature of the user interface bundle.

56. The wireless device of claim 54, wherein the processor is further configured to compare the bundle risk level to a bundle threshold.

57. The wireless device of claim 28, wherein the processor is further configured to detect a component digital signature of at least one user interface component.

58. The wireless device of claim 28, wherein the processor is further configured to compare at least one component risk level to a component risk level threshold.

59. The wireless device of claim 58, wherein the processor is further configured to selectively apply one or more of the one or more user interface components to the wireless device at least partially based on a result of comparing the component risk level to the component threshold.

60. The wireless device of claim 26, wherein the risk level further comprises one of a plurality of different risks levels, wherein each of the plurality of different risk levels varies based on an extent of the changes to the appearance of the user interface on the display of the wireless device caused by executing the user interface bundle at the wireless device.

61. The wireless device of claim 26, wherein the risk level is at least partially based on how long a developer of each user interface component has been involved in development of the user interface component.

62. The wireless device of claim 26, wherein the risk level further comprises a changed risk level changed during development of each user interface component at least partially based on a plurality of developers who have handled the user interface component in the development.

63. The system of claim 29, wherein each of the one or more user interface components is digitally signed using an embedded risk code that indicates the assigned risk level.

64. The system of claim 29, wherein the risk level is selected from a plurality of component risk levels.

65. The system of claim 29, wherein the risk level is determined at least partially based on a type of each user interface component.

66. The system of claim 29, wherein the risk level is determined at least partially based on a developer of each user interface component.

67. The system of claim 66, wherein a lower risk level is assigned to each user interface component that is developed by an approved developer.

68. The system of claim 66, wherein a higher risk level is assigned to each user interface component that is developed by an unapproved developer.

69. The system of claim 29, wherein each user interface bundle comprises a plurality of user interface components.

70. The system of claim 69, further comprising a security module configured to determine the bundle risk level.

71. The system of claim 70, wherein the security module determines the bundle risk level at least partially based on each component risk level of the plurality of user interface components within the user interface bundle.

72. The system of claim 31, further comprising having a fee for communicating the user interface bundle to the wireless device.

73. The system of claim 29, wherein the risk level further comprises one of a plurality of different risks levels, wherein each of the plurality of different risk levels varies based on an extent of the changes to the appearance of the user interface on the display of the wireless device caused by executing the user interface bundle at the wireless device.

74. The system of claim 29, wherein the risk level further comprises determining at least partially based on how long a developer of the user interface component has been involved in development of the user interface component.

75. The system of claim 29, wherein the risk level further comprises changing the risk level during development of each user interface component at least partially based on a plurality of developers who have handled the user interface component in the development.

76. The non-transitory computer-readable storage medium of claim 32, wherein the stored processor executable software instructions are configured to cause the processor to perform operations further comprising:
digitally signing each of the one or more user interface components using an embedded risk code that indicates the assigned risk level.

77. The non-transitory computer-readable storage medium of claim 32, wherein the component risk level is selected from a plurality of component risk levels.

78. The non-transitory computer-readable storage medium of claim 32, wherein the component risk level is determined at least partially based on a type of each user interface component.

79. The non-transitory computer-readable storage medium of claim 32, wherein the component risk level is determined at least partially based on a developer of each user interface component.

80. The non-transitory computer-readable storage medium of claim 79, wherein a lower risk level is assigned to each user interface component that is developed by an approved developer.

81. The non-transitory computer-readable storage medium of claim 79, wherein a higher risk level is assigned to each user interface component that is developed by an unapproved developer.

82. The non-transitory computer-readable storage medium of claim 32, wherein the stored processor executable software instructions are configured to cause the processor to perform operations further comprising:
downloading the one or more user interface components to a wireless device.

83. The non-transitory computer-readable storage medium of claim 32, wherein the stored processor executable software instructions are configured to cause the processor to perform operations further comprising:
bundling multiple user interface components to generate a user interface bundle.

84. The non-transitory computer-readable storage medium of claim 32, wherein the stored processor executable software instructions are configured to cause the processor to perform operations further comprising:
determining a bundle risk level for the user interface bundle.

85. The non-transitory computer-readable storage medium of claim 84, wherein the bundle risk level is determined at least partially based on each component risk level of user interface components within the user interface bundle.

86. The non-transitory computer-readable storage medium of claim 32, wherein the stored processor executable software instructions are configured to cause the processor to perform operations further comprising:
digitally signing the user interface bundle.

87. The non-transitory computer-readable storage medium of claim 86, wherein the stored processor executable software instructions are configured to cause the processor to perform operations further comprising:
downloading the user interface bundle to the wireless device.

88. The non-transitory computer-readable storage medium of claim 87, wherein the stored processor executable software instructions are configured to cause the processor to perform operations further comprising:
charging a fee to download the user interface bundle to the wireless device.

89. The non-transitory computer-readable storage medium of claim 88, wherein the user interface bundle is downloaded to the wireless device via an over the air interface.

90. The non-transitory computer-readable storage medium of claim 32, wherein the component risk level further comprises one of a plurality of different risks levels, wherein each of the plurality of different risk levels varies based on an extent of the changes to the appearance of the user interface on the display of the wireless device caused by executing the user interface component at the wireless device.

91. The non-transitory computer-readable storage medium of claim 32, wherein the component risk level is determined at least partially based on how long a developer of the user interface component has been involved in development of the user interface component.

92. The non-transitory computer-readable storage medium of claim 32, wherein the stored processor executable software instructions are configured to cause the processor to perform operations further comprising:
changing the risk level during development of the user interface component at least partially based on a plurality of developers who have handled the user interface component in the development.

93. The non-transitory computer-readable storage medium of claim 33, wherein the stored processor executable software instructions are configured to cause the processor to perform operations further comprising:
selecting the user interface bundle from a menu of available user interface bundles prior to receiving the user interface bundle.

94. The non-transitory computer-readable storage medium of claim 33, wherein the stored processor executable software instructions are configured to cause the processor to perform operations further comprising:
  detecting and decoding a bundle digital signature of the user interface bundle received from the download server.

95. The non-transitory computer-readable storage medium of claim 94, wherein the stored processor executable software instructions are configured to cause the processor to perform operations further comprising:
  determining the bundle risk level after decoding the bundle digital signature of the user interface bundle.

96. The non-transitory computer-readable storage medium of claim 95, wherein the stored processor executable software instructions are configured to cause the processor to perform operations further comprising:
  comparing the bundle risk level to a bundle threshold.

97. The non-transitory computer-readable storage medium of claim 96, wherein the stored processor executable software instructions are configured to cause the processor to perform operations further comprising:
  unbundling the user interface bundle to produce a plurality of user interface components after comparing the bundle risk level to the bundle threshold.

98. The non-transitory computer-readable storage medium of claim 97, wherein each of the plurality of user interface components has a component digital signature and a component risk level associated with loading the respective user interface component onto the wireless device.

99. The non-transitory computer-readable storage medium of claim 98, wherein the stored processor executable software instructions are configured to cause the processor to perform operations further comprising:
  detecting the component digital signature of at least one user interface component.

100. The non-transitory computer-readable storage medium of claim 98, wherein the stored processor executable software instructions are configured to cause the processor to perform operations further comprising:
  comparing at least one component risk level to a component risk level threshold.

101. The non-transitory computer-readable storage medium of claim 100, wherein the stored processor executable software instructions are configured to cause the processor to perform operations further comprising:
  selectively applying one or more of the plurality of user interface components to the wireless device at least partially based on a result of comparing the component risk level to the component threshold.

102. The non-transitory computer-readable storage medium of claim 33, wherein the risk level further comprises one of a plurality of different risks levels, wherein each of the plurality of different risk levels varies based on an extent of the changes to the appearance of the user interface on the display of the wireless device caused by executing the user interface bundle at the wireless device.

103. The non-transitory computer-readable storage medium of claim 33, wherein the risk level is at least partially based on how long a developer of the user interface component has been involved in development of the user interface component.

104. The non-transitory computer-readable storage medium of claim 33, wherein the risk level further comprises a changed risk level changed during development of the user interface component at least partially based on a plurality of developers who have handled the user interface component in the development.

105. The device of claim 34, further comprising means for digitally signing each of the one or more user interface components using an embedded risk code that indicates the assigned risk level.

106. The device of claim 34, wherein the component risk level is selected from a plurality of component risk levels.

107. The device of claim 34, wherein the component risk level is determined at least partially based on a type of each user interface component.

108. The device of claim 34, wherein the component risk level is determined at least partially based on a developer of each user interface component.

109. The device of claim 108, wherein a lower risk level is assigned to each user interface component that is developed by an approved developer.

110. The device of claim 108, wherein a higher risk level is assigned to each user interface component that is developed by an unapproved developer.

111. The device of claim 34, further comprising means for downloading the one or more user interface components to a wireless device.

112. The device of claim 34, further comprising means for bundling multiple user interface components to generate a user interface bundle.

113. The device of claim 112, further comprising means for determining a bundle risk level for the user interface bundle.

114. The device of claim 113, wherein the bundle risk level is determined at least partially based on each component risk level of user interface components within the user interface bundle.

115. The device of claim 114, further comprising means for digitally signing the user interface bundle.

116. The device of claim 115, further comprising means for downloading the user interface bundle to the wireless device.

117. The device of claim 116, further comprising means for charging a fee to download the user interface bundle to the wireless device.

118. The device of claim 117, wherein the user interface bundle is downloaded to the wireless device via an over the air interface.

119. The device of claim 34, wherein the component risk level further comprises one of a plurality of different risks levels, wherein each of the plurality of different risk levels varies based on an extent of the changes to the appearance of the user interface on the display of the wireless device caused by executing the user interface component at the wireless device.

120. The device of claim 34, wherein the component risk level is determined at least partially based on how long a developer of the user interface component has been involved in development of the user interface component.

121. The device of claim 34, wherein the means for determining the component risk level further comprise means for changing the risk level during development of the user interface component at least partially based on a plurality of developers who have handled the user interface component in the development.

* * * * *